United States Patent
Lu et al.

(10) Patent No.: US 9,106,614 B2
(45) Date of Patent: Aug. 11, 2015

(54) DATA TRANSMISSION METHOD AND APPARATUS

(75) Inventors: Lei Lu, Shanghai (CN); Wenliang Liang, Shanghai (CN); Dai Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 673 days.

(21) Appl. No.: 13/284,346

(22) Filed: Oct. 28, 2011

(65) Prior Publication Data

US 2012/0076092 A1 Mar. 29, 2012

Related U.S. Application Data

(63) Continuation of application No. PCT/CN2009/071605, filed on Apr. 30, 2009.

(51) Int. Cl.
*H04L 12/28* (2006.01)
*H04L 29/06* (2006.01)
*H04W 28/18* (2009.01)
*H04W 28/06* (2009.01)

(52) U.S. Cl.
CPC ............... *H04L 69/04* (2013.01); *H04W 28/18* (2013.01); *H04W 28/06* (2013.01)

(58) Field of Classification Search
USPC ........... 370/389–393, 474–476; 709/246–247
See application file for complete search history.

(56) References Cited

U.S. PATENT DOCUMENTS

| 7,430,617 | B2 * | 9/2008 | Walsh et al. ................... 709/247 |
| 7,898,980 | B2 * | 3/2011 | Kim et al. ...................... 370/254 |
| 2005/0190719 | A1 | 9/2005 | Lee et al. | |
| 2007/0286140 | A1 | 12/2007 | Kwon | |
| 2008/0144555 | A1 * | 6/2008 | Hong et al. ................... 370/310 |
| 2008/0320171 | A1 * | 12/2008 | Walsh et al. ................... 709/247 |
| 2009/0080422 | A1 * | 3/2009 | Lee et al. ...................... 370/389 |
| 2010/0135330 | A1 | 6/2010 | Liang et al. | |

FOREIGN PATENT DOCUMENTS

| CN | 1875558 | 12/2006 |
| CN | 101350768 | 1/2009 |
| CN | 101361937 | 2/2009 |
| CN | 101364980 | 2/2009 |
| CN | 101369977 | 2/2009 |
| WO | 00/21220 | 4/2000 |
| WO | 02/30043 | 4/2002 |

OTHER PUBLICATIONS

International Search Report, mailed Feb. 11, 2010, in corresponding International Application No. PCT/CN2009/071605 (5 pp.).

(Continued)

*Primary Examiner* — Phuc Tran
(74) *Attorney, Agent, or Firm* — Staas & Halsey LLP

(57) ABSTRACT

Embodiments of the present invention provide a data transmission method and apparatus. ROHC packets that use a same Context ID are encapsulated into MAC PDU, wherein the MAC PDU is formed by a MAC PDU packet header and a MAC PDU payload. The Context ID of the ROHC packets is carried in the MAC PDU packet header, and the Context ID is not carried in the ROHC packets. The MAC PDU is sent. In this way, transmission resources are saved, and transmission efficiency is improved.

5 Claims, 6 Drawing Sheets

(56) References Cited

OTHER PUBLICATIONS

Written Opinion of the International Searching Authority, mailed Feb. 11, 2010, in corresponding International Application No. PCT/CN2009/071605 (6 pp.).

International Search Report for PCT/CN2009/071605, mailed Feb. 11, 2010.

First Office Action, dated Apr. 11, 2013, in corresponding Chinese Application No. 200980100674.6 (14 pp.).

\* cited by examiner

| Type | 155 |
|---|---|
| Length in octets | Variable |
| Value | Compound TLV |
| Description | Includes the Per-Channel parameters according RFC3095 section 5.1.1 for a single ROHC SF. |
| Elements (Sub-TLVs) | TLV Name | M/O |
| | ROHC_MAX_CID | M |
| | ROHC_LARGE_CIDS | M |
| | ROHC_PROFILES | M |
| | ROHC_FEEDBACK_FOR | O |
| | ROHC_MRRU | O |
| | ROHC_SUPPORT_ONE_PROFILE | O |
| | ROHC_SUPPORT_ONE_CONTEXT | O |
| Parent TLV | SF Info |

DATA TRANSMISSION METHOD AND APPARATUS

CROSS-REFERENCE TO RELATED APPLICATIONS

This application is a continuation of International Application No. PCT/CN2009/071605, filed on Apr. 30, 2009, which is hereby incorporated by reference in its entirety.

FIELD OF THE INVENTION

The present invention relates to communications technologies, and in particular, to a data transmission method and apparatus.

BACKGROUND OF THE INVENTION

Due to the restrictions of physical conditions, compared with a wired link, the transmission rate of a wireless link is relatively low, but the bit error rate is relatively high. When the Internet Protocol (IP) technology is applied in an environment of a wireless network cell, a problem that a packet header overhead is too large exists. For example, in an IPv6 voice communication packet, a packet payload truly required by a user often occupies only 22% of the entire packet, which not only wastes the bandwidth, but also increases the probability of the packet being discarded due to a packet error. If no efficient measure is taken, the wireless network resources are wasted, and meanwhile, the Quality of Service (QoS) is reduced.

By using a header compression mechanism, the forgoing problem may be solved, and at the same time, the inherent flexibility of the IP protocol may be guaranteed. The header compression mechanisms may include Robust Header Compression (ROHC), Real-time Transport Protocol Header Compression (CRTP), and Extended RTP Header Compression (ECRTP).

The ROHC, for example, is a flow-based header compression scheme. During network data transmission, most of the header domains of a packet in a same flow have the same values. In the ROHC mechanism, one packet is selected from a certain flow as a reference packet, and for other packets, only the information in the header domains that is different from the reference packet is sent, so as to achieve the compression purpose, thereby saving the packet header overhead, and utilizing the bandwidth more efficiently. Meanwhile, the ROHC mechanism ensures high effectiveness and proper robustness by controlling the frequency and quantity of feedback messages, and detecting logic that is not synchronized, and through error check. Therefore, the ROHC mechanism provides a header compression mechanism that applies to a link with a high bit error rate and a long delay.

The ROHC mechanism has certain universality, and applies to various networks. The packet format defined by the ROHC mechanism requires that each ROHC packet add a Context ID of the packet and each Initial and Refresh (IR) packet and Initial and refresh-Dynamic (IR-DYN) packet add a Profile ID of the packet.

The inventor finds that, during data transmission, if each ROHC packet carries a Context ID and/or a Profile ID, data redundancy occurs, thereby wasting network transmission resources.

SUMMARY OF THE INVENTION

Embodiments of the present invention provided a data transmission method and apparatus, so as to solve the problem of wasting network transmission resources caused by that each ROHC packet carries a Context ID and/or a Profile ID during data transmission.

An embodiment of the present invention provides a data transmission method, which includes:
  obtaining information about whether a service flow supports single Context ID, or whether the service flow supports single Profile, or whether the service flow supports single Context ID and single Profile; and
  transmitting Robust Header Compression ROHC packets in the service flow, wherein: if the service flow supports single Context ID, the ROHC packets do not carry the Context ID; if the service flow supports single Profile, the ROHC packets do not carry the Profile ID of the Profile; if the service flow supports single Context ID and single Profile, the ROHC packets do not carry the Context ID and the Profile ID of the Profile.

An embodiment of the present invention provides another data transmission method, which includes:
  encapsulating ROHC packets that use a same Context ID into Media Access Control MAC Protocol Data Unit MAC PDU, wherein the MAC PDU is formed by a MAC PDU packet header and a MAC PDU payload; the MAC PDU packet header carries the Context ID of the ROHC packets; and the ROHC packets carried in the MAC PDU payload do not carry the Context ID; and sending the MAC PDU.

An embodiment of the present invention provides another data transmission method, which includes:
  encapsulating ROHC packets that use a same Context ID into MAC PDU, wherein the ROHC packets carried in the MAC PDU do not carry the Context ID;
  constructing a downlink scheduling message, wherein the downlink scheduling message carries the Context ID and the number of the MAC PDU; and
  sending the downlink scheduling message and the encapsulated MAC PDU.

An embodiment of the present invention provides another data transmission method, which includes:
  receiving, by a Base Station BS, a capability negotiation request from a Mobile Station MS, wherein the capability negotiation request carries capability information about whether the MS supports that a Context ID is carried in a flow identifier;
  if the Mobile Station MS supports that the Context ID is carried in the flow identifier, determining, by the Base Station BS, a structure of the flow identifier, having the determined flow identifier structure carried in a capability negotiation response message, and sending the capability negotiation response message to the Mobile Station MS; and
  sending, by the Base Station BS, ROHC packets in a service flow identified by the flow identifier, or receiving ROHC packets from the Mobile Station MS in the service flow identified by the flow identifier, wherein the ROHC packets do not carry a Context ID.

In the embodiment of the present invention, a CID may be associated with the Context ID and/or Profile ID, so that the ROHC packet does not carry the Context ID and/or Profile ID during data transmission. In this way, a waste of transmission resources is reduced, and transmission efficiency is improved. In addition, ROHC packets with a same Context ID may be encapsulated into MAC PDU, and the Context ID is carried in the packet header of the MAC PDU, but does not need to be carried in each ROHC packet. In this way, a waste of transmission resources is reduced, and transmission efficiency is improved.

BRIEF DESCRIPTION OF THE DRAWINGS

FIG. 10 is a diagram illustrating new field(s) added to a ROHC parameter.

DETAILED DESCRIPTION OF THE EMBODIMENTS

In order to make the objectives, technical solutions and advantages of the embodiments of the present invention more comprehensible, the technical solutions provided in the embodiments of the present invention are described in details in the following with reference to the specific embodiments and the accompany drawings.

In an embodiment of the present invention, in the scenario where a same connection bears single Context ID, the CID (connection identifier) of the connection can be associated with the Context ID. In this case, the CID of the connection can serve as the Context ID, and the Context ID in the ROHC packets can be omitted during data transmission over this connection. Or, in the embodiment of the present invention, if, during establishment of the service flow corresponding to the connection, the delivered classification rules merely include relevant information about single Profile, the CID of the connection may also be associated with the Profile ID of the single Profile. In this case, the transmitted ROHC packets do not need to carry the Profile ID. Or, a combination of the above two cases may occurs, that is, if the connection bears single Context ID and the classification rules merely include relevant information about single Profile, the CID of the connection may be associated with the Context ID and Profile ID of the single Profile. In this case, the Context ID and Profile ID in the ROHC packets may be omitted during data transmission over this connection.

Table 1 shows the format of the ROHC packet after Context ID is deleted in an embodiment of the present invention.

TABLE 1

| 0 | ....... | x-1 | X | ....... | 7 |
|---|---|---|---|---|---|
| Padding | | | ~~Add CID octet (if (CID 1-15) and (small CIDs))~~ ||||
| type indication | | | body ||||
| ~~0, 1, or 2 octets of CID (1 or 2 octets if (large CIDs))~~ ||||||
| body ||||||

Table 2 shows the format of the ROHC packet after Profile ID is deleted in an embodiment of the present invention.

TABLE 2

| 0 | 1 | 2 | 3 | 4 | 5 | 6 | 7 |
|---|---|---|---|---|---|---|---|
| Add-CID octet (: if for small CIDs and (CID ! = 0)) ||||||||
| 1 | 1 | 1 | 1 | 1 | 1 | 0 | x |
| ....... ||||||||
| 0-2 octets of CID ||||||||
| ~~Profile~~ ||||||||
| CRC ||||||||
| ~~profile specific information~~ ||||||||

Table 3 shows the format of the ROHC packet after Context ID and Profile ID are deleted in an embodiment of the present invention.

TABLE 3

| 0 | 1 | 2 | 3 | 4 | 5 | 6 | 7 |
|---|---|---|---|---|---|---|---|
| ~~Add-CID octet (: if for small CIDs and (CID ! = 0))~~ ||||||||
| 1 | 1 | 1 | 1 | 1 | 1 | 0 | x |
| ....... ||||||||
| ~~0-2 octets of CID~~ ||||||||
| ~~Profile~~ ||||||||
| CRC ||||||||
| ~~profile specific information~~ ||||||||

Figure 1:
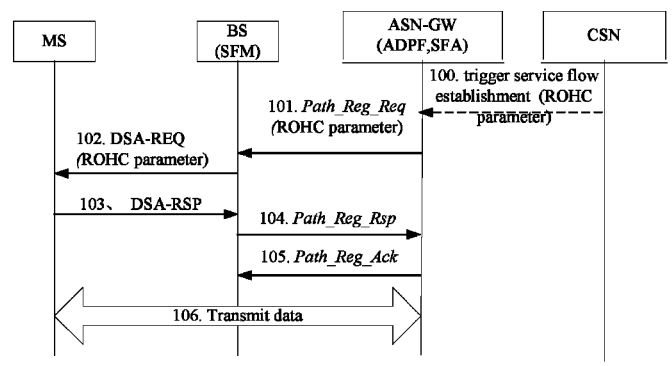
FIG. 1 is a flow chart of a negotiation between communication parties according to an embodiment of the present invention.

Preferentially, in the scenario where a same connection bears single Context ID, both communication parties may negotiate in advance about whether to support single Context or single Profile. As shown in FIG. 1, an embodiment of the present invention further provides a method of a negotiation between communication parties in an embodiment of the present invention, which is specifically as follows.

Step 100: An access service network gateway ASN-GW receives an establishment request message from a connection service network (CSN), and starts to establish an SF (Service flow).

When a service flow needs to be established, the ASN-GW (Access Service Network Gateway) receives the establishment request message from the CSN (connection service Network) and triggers establishment of an ROHC service flow. The CSN notifies the ASN-GW in the establishment request message of whether the ROHC service flow supports single Profile, or whether the ROHC service flow supports single Context ID, or whether the ROHC service flow supports single Profile and whether the ROHC service flow supports single Context ID.

The establishment request message may be an AAA-REQ (Authentication, Authorization, Accounting request) message, or a RAR (Re-Auth Request) message, where the message may carries an ROHC parameter provided in an embodiment of the present invention. The ROHC parameter carries information about whether the ROHC service flow supports single Profile, whether the ROHC service flow supports single Context ID, or whether the ROHC service flow supports single Profile and whether the ROHC service flow supports single Context ID. An embodiment of the present invention provides two modes to carry the information in the ROHC parameter, which are as follows.

Mode 1: Adding new fields in the ROHC parameter to carry the information, as shown in Table 4.

TABLE 4

ROHC parameter

| Type | 155 |
|---|---|
| Length in octets | Variable |
| Value | Compound TLV |
| Description | Includes the Per-Channel parameters according RFC3095 section 5.1.1 for a single ROHC SF. |

| Elements | TLV Name | M/O |
|---|---|---|
| (Sub-TLVs) | ROHC_MAX_CID | M |
|  | ROHC_LARGE_CIDS | M |
|  | ROHC_PROFILES | M |
|  | ROHC_FEEDBACK_FOR | O |
|  | ROHC_MRRU | O |
|  | ROHC_SUPPORT_ONE_PROFILE | O |
|  | ROHC_SUPPORT_ONE_CONTEXT | O |
| Parent TLV | SF Info |  |

In Table 4 as shown in FIG. 10, field ROHC_SUPPORT_ONE_PROFILE and field ROHC_SUPPORT_ONE_CONTEXT are newly added fields in the embodiment of the present invention, where the ROHC_SUPPORT_ONE_PROFILE field is used to indicate whether the ROHC service flow supports single Profile, and the ROHC_SUPPORT_ONE_CONTEXT field is used to indicate whether the ROHC service flow supports single Context ID. These two fields are optional. During data transmission, either, both, or neither of the fields can be carried according to actual situations.

Table 5 shows the format of the ROHC_SUPPORT_ONE_PROFILE field.

TABLE 5

| Type | X + 7 |
|---|---|
| Length in octets | 1 |
| Value | 0x00 = ROHC ONE PROFILE is not supported |
|  | 0x01 = ROHC ONE PROFILE is supported |
| Description |  |
| Parent TLV | ROHC Parameter |

In this embodiment, when the value of this field is 0x01, it indicates that this ROHC service flow supports single Profile; when the value of this field is 0x00, it indicates that this ROHC service flow does not support single Profile. Or, in the embodiment of the present invention, when the value of this field is 0x00, it indicates that this ROHC service flow supports single Profile; when the value of this field is 0x01, it indicates that this ROHC service flow does not support single Profile;

Table 6 shows the format of the ROHC_SUPPORT_ONE_CONTEXT field.

TABLE 6

| Type | X + 7 |
|---|---|
| Length to octets | 1 |
| Value | 0x00 = ROHC ONE CONTEXT is not supported |
|  | 0x01 = ROHC ONE CONTEXT is supported |
| Description |  |
| Parent TLV | ROHC Parameter |

It can be seen from Table 6 that, when the value of this field is 0x01, it indicates that this ROHC service flow supports single Context ID; when the value of this field is 0x00, it indicates that this ROHC service flow does not support single Context ID. Definitely, in the embodiment of the present invention, when the value of this field is 0x00, it indicates that this ROHC service flow supports single Context ID; when the value of this field is 0x01, it indicates that this ROHC service flow does not support single Context ID;

Mode 2: Endow new meanings to the existing fields, as shown in Table 7.

TABLE 7

| Type | 155 |
|---|---|
| Length in octets | Variable |
| Value | Compound TLV |
| Description | Includes the Per-Channel parameters according RFC3095 section 5.1.1 for a single ROHC SF. |

| Elements | TLV Name | M/O |
|---|---|---|
| (Sub-TLVs) | ROHC_MAX_CID | M |
|  | ROHC_LARGE_CIDS | M |
|  | ROHC_PROFILES | M |
|  | ROHC_FEEDBACK_FOR | O |
|  | ROHC_MRRU | O |
| Parent TLV | SF Info |  |

As shown in Table 7, in this embodiment, when the ROHC_LARGE_CIDS field is set to a preset value, it indicates that the ROHC service flow supports single Context ID. For example, it may be that when the ROHC_LARGE_CIDS field is set to 0, it indicates that the ROHC service flow supports single Context ID. The preset value may be set by the operator according to the specific requirements. When the ROHC_PROFILES field is set to a preset value, it indicates whether the service flow supports single Profile. For example, when the ROHC_PROFILES field is set to a preset value, it indicates that the ROHC service flow carries the Profile indicated by the ROHC_PROFILES field;

Step 101: The ASN-GW notifies a BS to establish the service flow.

After receiving the establishment request from the CSN, the ASN-GW sends a message to the BS to notify the BS to establish a service flow. The message may be a Path_Reg_Req message, and the ROHC parameter provided in the forgoing embodiment of the present invention is carried in this message, so as to notify the BS that whether the ROHC service flow supports single Profile, whether the ROHC service flow supports single Context ID, or whether the ROHC service flow supports single Profile and whether the ROHC service flow supports single Context ID.

Step 102: The BS requests an MS to establish an air interface connection corresponding to the service flow.

In the embodiment of the present invention, the BS sends an air interface message to the MS, where the air interface message may be a DSA-REQ message, and the ROHC parameter provided in the forgoing embodiment of the present invention is carried in this message, so as to notify the BS that whether the ROHC service flow supports single Profile, whether the ROHC service flow supports single Context ID, or whether the ROHC service flow supports single Profile and whether the ROHC service flow supports single Context ID.

Step 103: The MS returns a DSA-RSP message to the BS.

Step 104: The BS returns a Path_Reg_Rsp message to the ASN-GW.

Step 105: The ASN-GW sends a Path_Reg_Ack message to the BS after receiving the Path_Reg_Rsp message from the BS.

By far, the establishment of the ROHC service flow is completed, and both communication parties can transmit data through the ROHC service flow.

If it has been negotiated that the ROHC service flow supports single Context ID during the negotiation, the CID of the connection may be associated with the Context ID. This CID may serve as the Context ID. In this case, the Context ID in the ROHC packets transmitted over this connection may be omitted during data transmission.

If it has been negotiated that the ROHC service flow supports single Profile during the negotiation, and the ROHC service flow merely includes information about single Profile, and the CID of the connection may be associated with the Profile ID of the single Profile. In this case, the Profile ID in the transmitted ROHC packets may be omitted during data transmission.

If it has been negotiated that the ROHC service flow supports single Context ID and single Profile during the negotiation, the CID of the connection may be associated with the Context ID and the Profile ID of the single Profile. In this case, the Context ID and Profile ID in the transmitted ROHC packets may be omitted during data transmission.

In the embodiment of the present invention, if a service flow that supports single Profile and/or single Context ID is established, the Profile and/or Context born in this service flow cannot be changed. If the data property is changed during data transmission, for example, if the Profile and/or Context of data are changed, the Service Flow Management (SFM) in the BS may bear the data whose property is changed by establishing a new connection. Optionally, for a dynamic service flow, the connection attribute may be directly modified to bear the data whose property is changed.

Embodiment 2

In the scenario where a same connection may bear multiple Context IDs, ROHC packets with a same Context ID may be arranged and sent in a unified way during scheduling of data transmission. In this way, a public Context ID may be used to indicate a Context ID of a corresponding ROHC packet, and the Context ID does not need to be carried in each ROHC packet, thereby saving transmission resources and improving transmission efficiency.

Figure 2:
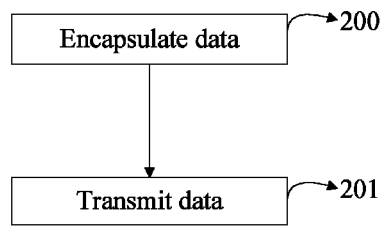
FIG. 2 is a flow chart of a data transmission method according to an embodiment of the present invention.

FIG. 2 is a schematic diagram of a data transmission method according to an embodiment of the present invention.

Step 200: Encapsulate data;

After a connection is established, a data sending end encapsulates the ROHC packets to be transmitted with a same Context ID into MAC PDU (Media Access Control Protocol Data Unit) at Media Access Control MAC layer, where a MAC PDU is formed by a MAC PDU packet header and a MAC PDU payload; the MAC PDU packet header carries the Context ID of the ROHC packets; and the ROHC packets carried in the MAC PDU payload do not carry the Context ID.

Step 201: Transmit data.

The data sending end sends the MAC PDU encapsulated in step 200.

In the embodiment of the present invention, the Context ID of the ROHC packets is carried in the packet headers of the encapsulated MAC PDU during MAC layer encapsulation, and the ROHC packets carried in the MAC PDU do not need to carry the Context ID. In this way, transmission resources are saved, and transmission efficiency is improved.

In the embodiment of the present invention, the Context ID of the ROHC packets may be carried in the packet headers of the encapsulated MAC PDU in several modes as follows.

Mode 1: During data encapsulation, the packet header of a MAC PDU may be divided into two parts, that is, a public MAC PDU packet header and an independent MAC PDU packet header. The public MAC PDU packet header is used to carry public information, which may be the Context ID of the ROHC packets carried in the MAC PDU, and further includes the CID and/or security parameter of the connection. The independent MAC PDU packet header includes other relevant information of the MAC PDU, for example, cyclic check and length indication information.

Specifically, the case that 100 ROHC packets are sent over the connection, where the 100 ROHC packets use two different Context IDs is taken as an example for illustration. It is assumed that 60 ROHC packets thereof use a first Context ID, and other 40 ROHC packets use a second Context ID. During data transmission, the data sending end encapsulate the 60 ROHC packets that use the first Context ID into MAC PDU at the MAC layer. According to the embodiment of the present invention, the packet header of a first encapsulated MAC PDU may include a public MAC PDU packet header and an independent MAC PDU packet header. The public MAC PDU packet header carries the first Context ID, and may further include the CID and/or security parameter of the connection. The independent MAC PDU packet header includes other relevant information of the MAC PDU, for example, cyclic check information. Other MAC PDU encapsulated from the 60 ROHC packets that use the first Context ID may merely include the independent MAC PDU packet header. Similarly, same processing is performed for other 40 ROHC packets that use the second Context ID.

Mode 2: In the embodiment of the present invention, a MAC PDU sub packet header may be added to the end of the MAC PDU packet header during data encapsulation. The MAC PDU sub packet header includes the Context ID, and all packets behind the MAC PDU sub packet header use a same Context ID. Table 8 shows the format of the MAC PDU sub packet header according to an embodiment of the present invention.

TABLE 8

| MAC PDU subheader( ){ } | |
| --- | --- |
| type | indicates sub packet header type |
| Context ID | context ID |

Figure 3:
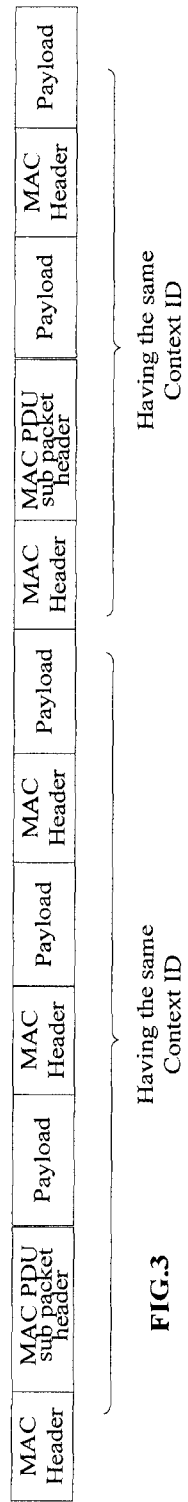
FIG. 3 is a schematic structure diagram of a MAC PDU formed through encapsulation in a data transmission method according to an embodiment of the present invention.

Specifically, the case that 100 ROHC packets are sent over the connection, where the 100 ROHC packets use two different Context IDs is taken as an example. It is assumed that 60 ROHC packets thereof use a first Context ID, and other 40 ROHC packets use a second Context ID. During data transmission, the data sending end encapsulate the 60 ROHC packets that use the first Context ID into MAC PDU at the MAC layer. According to this embodiment of the present invention, a MAC PDU sub packet header is added to the first encapsulated MAC PDU. The MAC PDU sub packet header includes the first Context ID, and all packets behind the MAC PDU sub packet header use the first Context ID. When other 40 ROHC packets are encapsulated, a new MAC PDU sub packet header is added to the first MAC PDU encapsulated from the 40 ROHC packets. The newly added MAC PDU sub packet header includes the second Context ID. As shown in FIG. 3, in this embodiment, for the ROHC packets that use a same Context ID, only the MAC PDU sub packet header is used to carry the Context ID during MAC layer encapsulation, and the Context ID does not need to be carried in each ROHC packet. In this way, transmission resources are saved, and transmission efficiency is improved.

Mode 3: After a connection is established, a data sending end encapsulates the ROHC packets to be transmitted with a same Context ID into Media Access Control Protocol Data Unit MAC PDU at Media Access Control MAC layer, where a MAC PDU is formed by a MAC PDU packet header and a MAC PDU payload. In this embodiment, during data encapsulation, the Context ID does not need to be carried in each ROHC packet. Instead, a field, for example, the Context ID TLV field, is added to the MAC PDU packet header to carry the Context ID, as shown in Table 9.

TABLE 9

| Type | TBD |
|---|---|
| Length | Variable |
| Value | Context Identifier |

Preferentially, during data transmission in step 201, for mode 1, to further ensure security of data transmission, when sending the MAC PDU encapsulated in step 200, the data sending end may transmit the public MAC PDU packet header of the MAC PDU in a separate Hybrid Automatic Repeat Request HARQ channel, and transmit independent MAC PDU packet header and MSC PDU payload in other HARQ channel. For example, the public MAC PDU package header is transmitted in a first HARQ channel, and the independent MAC PDU packet header and MAC PDU payload are transmitted in a second HARQ channel. Further, for the public MAC PDU packet header transmitted in the first HARQ channel, a Modulation and Coding Scheme MCS with a higher robustness may be used to perform modulation and coding. In this way, security transmission of the information can be further ensured.

For mode 2, to further ensure security of data transmission, when sending the MAC PDU encapsulated in step 200, the data sending end may transmit the MAC PDU sub packet header of the MAC PDU in a separate HARQ channel, and transmit the independent MAC PDU packet header and MAC PDU payload in other HARQ channel. For example, the MAC PDU sub packet header of the MAC PDU is transmitted in a first HARQ channel, and the independent MAC PDU packet header and MAC PDU payload is transmitted in a second HARQ channel. Further, for the MAC PDU sub packet header transmitted in the first HARQ channel, a Modulation and Coding Scheme MCS with a higher robustness may further be used to perform modulation and coding. In this way, security transmission of this information may be further ensured.

The data transmission method provided in the embodiment of the present invention is applicable to uplink transmission and downlink transmission. That is, the data sending end may be a BS or an MS. Accordingly, the data receiving end may be an MS or a BS.

Figure 4:
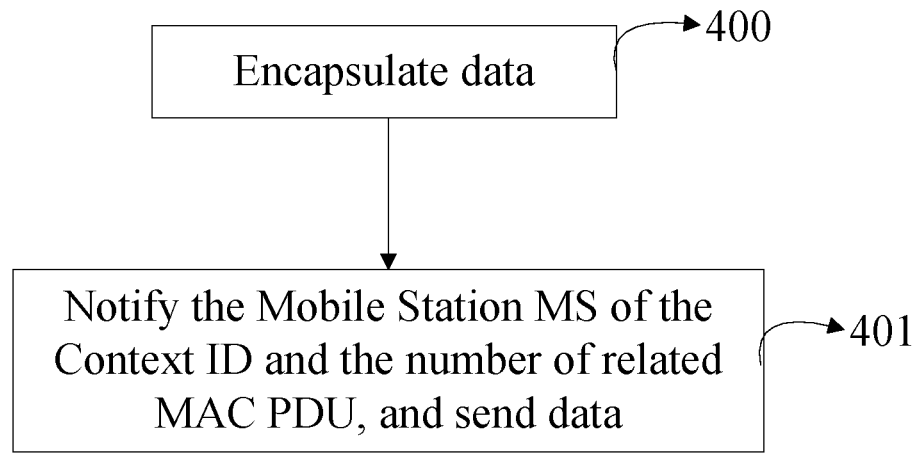
FIG. 4 is a flow chart of a data transmission method according to an embodiment of the present invention.

As shown in FIG. 4, an embodiment of the present invention further provides a data transmission method. During downlink data transmission, a BS schedules ROHC packets with a same Context ID for MAC layer encapsulation to form MAC PDU. During encapsulation, the ROHC packets do not need to carry the Context ID. The BS notifies an MS of the relevant Context ID information through other message, which are specifically as follows.

Step 400: Encapsulate data.

After a connection is established, the BS encapsulates ROHC packets with a same Context ID into Media Access Control Protocol Data Unit MAC PDU at Media Access Control MAC layer. In the embodiment of the present invention, during data encapsulation, the Context ID does not need to be carried in each ROHC packet.

Step 401: Notify the MS of the Context ID and the number of related MAC PDU, and send data.

In the embodiment of the present invention, for the MAC PDU with a same Context ID encapsulated in Step 400, the BS notifies the MS of the Context ID and the number of related MAC PDU through a downlink scheduling message. For example, the information may be sent to the MS through a DL_MAP message. The BS sends the encapsulated MAC PDU to the MS. In this embodiment, the MAC PDU and the DL_MAP message may be carried in a same frame, and sent to the MS. The MS parses the MAC PDU from the BS according to the Context ID and the number of related MAC PDU obtained through parsing of the downlink scheduling message to obtain the ROHC packets and the corresponding Context ID used by the ROHC packets.

In this embodiment, the ROHC packets that use a same Context ID notify the MS of the Context ID and the number of related MAC PDU through a downlink scheduling message, and the ROHC packets encapsulated into the MAC PDU do not need to carry the Context ID. In this way, transmission resources are saved, and transmission efficiency is improved.

Embodiment 3

Figure 5:
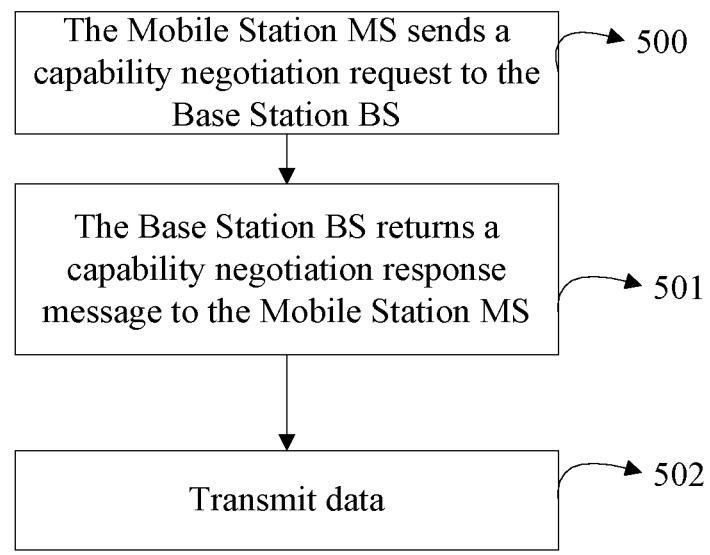
FIG. 5 is a flow chart of a data transmission method according to an embodiment of the present invention.

In the scenario where a flow identifier is used to identify a service flow, in the embodiment of the present invention, the flow identifier can indicate the Context ID. In this way, the ROHC packets transmitted in this service flow do not need to carry the Context ID. In the embodiment of the present invention, the structure of the flow identifier may be flexibly designed, so that several bits in the structure may be used to indicate the Context ID. Or, the structure of the flow identifier may be obtained through negotiation between the MS and the BS in advance, as shown in FIG. 5, which is specifically as follows.

Step 500: The BS receives a capability negotiation request from the MS.

In the embodiment of the present invention, in the capability negotiation process during accessing the network, the MS may negotiate with the BS about the structure of the flow identifier. For example, it may be that the BS receives a capability negotiation request from the MS, where the capability negotiation request carries capability information about whether the MS supports that a Context ID is carried in the flow identifier. For example, the capability negotiation request may be an SBC_REQ message, and it may be that a new field is added to the message to carry information about whether the MS supports that a Context ID is identified in the flow identifier. The field is as shown in Table 10.

TABLE 10

| Type | TBD |
|---|---|
| Length in octets | 1 |
| Value | 0 or 1 |

As shown in Table 10, if the value of the field value is 0, it indicates that the MS does not support that the Context ID information is identified in the flow identifier; if the value of this field is 1, it indicates that the MS supports that the Context ID information is identified in the flow identifier;

Step 501: The BS returns a capability negotiation response to the MS.

After receiving the capability negotiation request, for example, an SBC_REQ message, from the MS, the BS returns a capability negotiation response, for example, an SBC_RSP message, to the MS. In this embodiment, if the capability negotiation request sent by the MS indicates that the MS does not support that the a Context ID is identified in the flow identifier, the conventional technology can be used for processing; if the capability negotiation request sent by the MS indicates that the MS supports that a Context ID is carried in the flow identifier, the flow identifier structure field may be added to the capability negotiation response message, and the structure of the flow identifier determined by the BS is sent through this field to the MS. Table 11 shows the structure of the flow identifier structure field.

TABLE 11

| Type | TBD |
|---|---|
| Length in octets | 2 |
| Value | |

As shown in Table 11, a structure of the flow identifier is described in the flow identifier structure field. The flow identifier includes 2 bytes (i.e. 16 bits). The value of each bit is 0 or 1, respectively indicating that the bit indicates flow information or Context ID information. When Bit=1, it indicates that this bit is used to identify the flow information; when Bit=0, it indicates that this bit is used to identify the Context ID information. Definitely, it may also be that Bit=0, it indicates that this bit is used to identify the flow information; and Bit=1, it indicates that this bit is used to identify the Context ID information.

Step 502: Transmit data.

After capability negotiation is completed, the BS and MS may perform data transmission. During transmission, since the Context ID information is informed in the flow identifier that identifies the service flow, the ROHC packets transmitted in this service flow do not need to carry the Context ID again. In this way, transmission resources are saved, and transmission efficiency is improved.

In the method provided in the embodiment of the present invention, after the MS and the BS negotiate the structure of the flow identifier, the Context ID of the ROHC packets may be omitted during uplink or downlink data transmission.

Figure 6:
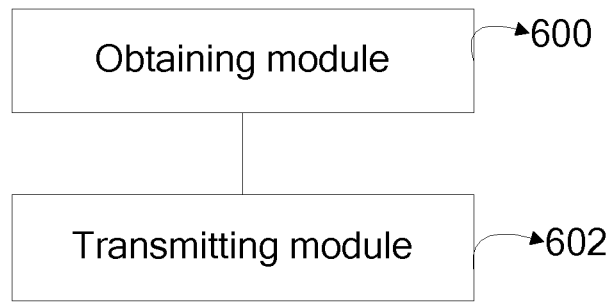
FIG. 6 is a schematic structure diagram of a data transmission apparatus according to an embodiment of the present invention.

An embodiment of the present invention further provides a data transmission apparatus. FIG. 6 shows the apparatus provided in the embodiment of the present invention. The apparatus includes an obtaining module 600 and a transmitting module 602, where the obtaining module 600 is configured to obtain information about whether a service flow supports single Context ID, whether the service flow supports single Profile, or whether the service flow supports single Context ID and single Profile; and the transmitting module 602 is configured to transmit Robust Header Compression ROHC packets over the service flow. If the service flow supports single Context ID, the ROHC packets do not carry the Context ID; if the service flow supports single Profile, the ROHC packets do not carry the Profile ID of the Profile; and, if the service flow supports single Context ID and single Profile, the ROHC packets do not carry the Context ID and the Profile ID of the Profile. In this embodiment, the data transmission apparatus may be an access service network gateway ASN-GW. After the data transmission apparatus obtains related information, the ROHC packets transmitted over the service flow do not need to carry the Context ID and/or Profile ID again. In this way, transmission resources are saved, and transmission efficiency is improved.

Figure 7:
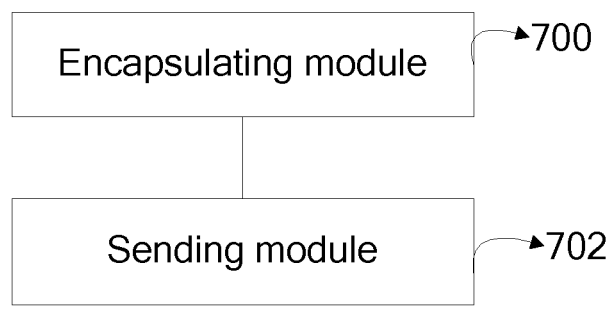
FIG. 7 is a schematic structure diagram of a data transmission apparatus according to an embodiment of the present invention.

An embodiment of the present invention further provides a data transmission apparatus. FIG. 7 shows the data transmission apparatus provided in this embodiment, where the apparatus includes:

an encapsulating module 700, configured to: encapsulate ROHC packets with a same Context ID into MAC PDU, where: a MAC PDU is formed by a MAC PDU packet header and a MAC PDU payload; the MAC PDU packet header carries the Context ID of the ROHC packets; and the ROHC packets carried in the MAC PDU payload do not carry the Context ID; and a sending module 702, configured to send the MAC PDU.

According to the apparatus provided in this embodiment of the present invention, during MAC PDU encapsulation, the Context ID of the ROHC packets is encapsulated in the packet header of the MAC PDU, and the ROHC packets carried in the MAC PDU do not need to carry the Context ID. In this way, transmission resources are saved, and transmission efficiency is improved.

Further, the encapsulating module 700 specifically includes: a MAC PDU packet header encapsulating module and a MAC PDU payload encapsulating module.

The MAC PDU packet header encapsulating module is configured to encapsulate a public MAC PDU packet header and an independent MAC PDU packet header for a first MAC PDU when encapsulating the first MAC PDU, where the public MAC PDU packet header carries the Context ID, and the independent MAC PDU packet header carries the information of the MAC PDU, for example, cyclic check and length indication information. The MAC PDU packet header encapsulating module is configured to encapsulate independent MAC PDU packet header for other MAC PDU, where the public MAC PDU packet header may further carry the CID of the connection and/or security parameters.

Or, the MAC PDU packet header encapsulating module is configured to encapsulate a MAC PDU packet header and a MAC PDU sub packet header for a first MAC PDU when encapsulating the first MAC PDU, where: the MAC PDU sub packet header carries the Context ID and encapsulate the MAC PDU packet header for other MAC PDU; the format of the MAC PDU sub packet may be the format shown in the above Table 8; and the MAC PDU packet header includes related information about the MAC PDU, for example, cyclic check and length indication information.

Or, the MAC PDU packet header encapsulating module is configured to encapsulate a MAC PDU packet header for a MAC PDU, where the MAC PDU packet header carries the Context ID, for example, a field, such as Context ID TLV field, may be added to the MAC PDU packet header to carry the Context ID, as shown in Table 9.

The MAC PDU payload encapsulating module is configured to encapsulate a MAC PDU payload for MAC PDU, that is, the ROHC packets used as the payload is encapsulated into the MAC PDU payload, where each ROHC packet encapsulated in the MAC PDU payload does not need to carry the Context ID.

Preferentially, the sending module 702 may further include a first sending sub module and a second sending sub module, where: the first sending sub module may be configured to send the public MAC PDU packet header in a first hybrid automatic repeat request channel; the second sending sub module may be configured to send the independent MAC PDU packet header and MAC PDU payload in a second hybrid automatic repeat request channel; or the first sending sub module may be configured to send the MAC PDU sub packet header in the first hybrid automatic repeat request channel; and the second sending sub module may be configured to send the MAC PDU packet header and MAC PDU payload in the second hybrid automatic repeat request channel.

Preferentially, the sending module 702 can further include a modulating and encoding module, where the module is configured to use the Modulation and Coding Scheme MCS with a high robustness to modulate and encode the public MAC PDU packet header or MAC PDU sub packet header; the first sending sub module is configured to send the public MAC PDU packet header or MAC PDU sub packet header after modulation and encoding in the first hybrid automatic repeat request channel.

In this embodiment of the present invention, the data transmission apparatus may be a Base Station BS or a Mobile Station MS.

Figure 8:
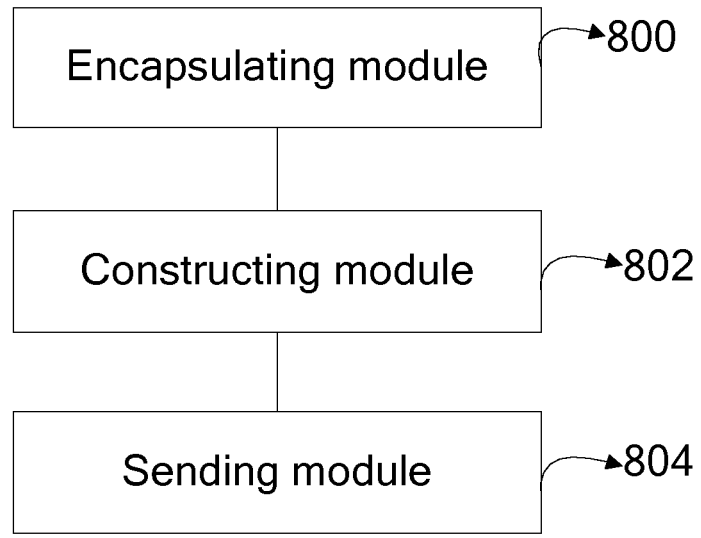
FIG. 8 is a schematic structure diagram of a data transmission apparatus according to an embodiment of the present invention.

An embodiment of the present invention further provides a data transmission apparatus. As shown in FIG. 8, the apparatus includes an encapsulating module 800, a constructing module 802, and a sending module 804. The encapsulating module 800 is configured to encapsulate ROHC packets that use a same Context ID into MAC PDU, where the ROHC packets carried in the MAC PDU do not carry the Context ID. The constructing module 802 is configured to construct a downlink scheduling message, where the downlink scheduling message carries the Context ID and the number of MAC PDU encapsulated by the encapsulating module 800. The sending module 804 is configured to send the downlink scheduling message and encapsulated MAC PDU. The downlink scheduling message here may be a DL_MAP message. The sending module may have the MAC PDU and the DL_MAP message carried in a same frame and send the frame to the MS. In this case, the MS parses the MAC PDU from the BS according to the Context ID and the number of related MAC PDU obtained through parsing of the downlink scheduling message to obtain the ROHC packets and the corresponding Context ID used by the ROHC packets.

According to the data sending apparatus, the ROHC packets that use a same Context ID may notify the MS of the Context ID and the number of related MAC PDU through a downlink scheduling message, and the ROHC packets encapsulated into the MAC PDU do not need to carry the Context ID. In this way, transmission resources are saved, and transmission efficiency is improved.

Figure 9:
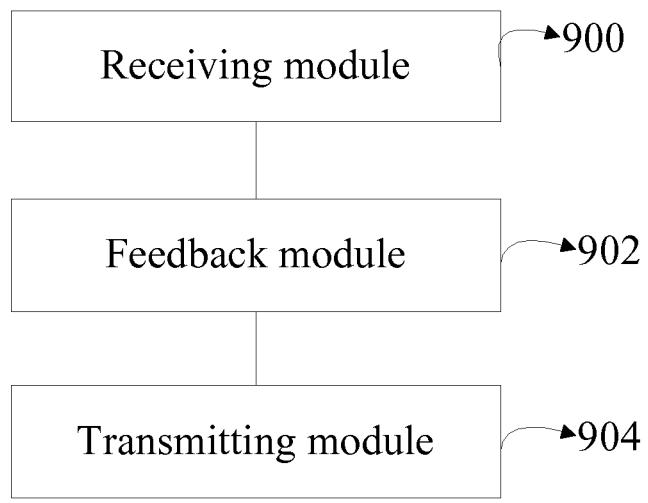
FIG. 9 is a schematic structure diagram of a BS according to an embodiment of the present invention.

An embodiment of the present invention further provides a base station. As shown in FIG. 9, the base station includes a receiving module 900, a feedback module 902, and a transmitting module 904. The receiving module 900 is configured to receive a capability negotiation request from a Mobile Station MS, where the capability negotiation request carries capability information about whether the Mobile Station MS supports that a Context ID is carried in a flow identifier. In the embodiment of the present invention, in capability negotiation process during accessing the network, the Mobile Station MS may negotiate with the BS about a structure of the flow identifier. The capability negotiation request may be an SBC_REQ message, and it may be that a new field is added to the message to carry information about whether the MS support that Context ID information is identified in the flow identifier. The field is as shown in Table 10. The feedback module 902 is configured to, if the Mobile Station MS supports that the Context ID is carried in the flow identifier, determine the structure of the flow identifier, have the determined structure of the flow identifier carried in a capability negotiation response message, and send the capability negotiation response message to the Mobile Station MS. The capability negotiation response message may be an SBC_RSP message, and it may be that a flow identifier structure field is added to the capability negotiation response message. The flow identifier structure determined by the Base Station BS is sent to the Mobile Station MS through this field. Table 11 shows the structure of the flow identifier structure field provided in this embodiment of the present invention. The transmitting module 904 is configured to send ROHC packets in a service flow identified by the flow identifier to the mobile station, or receive ROHC packets from the mobile station in the service flow identified by the flow identifier, where the ROHC packets do not carry a Context ID.

In this way, after the base station according to an embodiment of the present invention negotiates with the mobile station about the structure of the flow identifier, the Context ID in the ROHC packets may be omitted during uplink or downlink data transmission. In this way, transmission resources are saved, and transmission efficiency is improved.

Persons of ordinary skill in the art may understand that all or a part of the steps in the method according to the embodiments of the present invention may be implemented by a program instructing relevant hardware, and the program may be stored in a computer readable storage medium. When the program is run, the steps are as follows: encapsulating ROHC packets that use a same Context ID into Media Access Control MAC Protocol Data Units MAC PDU, where: the MAC PDU is formed by a MAC PDU packet header and a MAC PDU payload; the MAC PDU packet header carries the Context ID of the ROHC packets; and the ROHC packets carried in the MAC PDU payload do not carry the Context ID; and sending the MAC PDU.

The storage medium mentioned above may be a read-only memory, a magnetic disk, or an optical disk.

To sum up, the above descriptions are merely the exemplary embodiments of the present invention, but the protection scope of the present invention is not limited thereto. Any modification or replacement that can be easily figured out by persons skilled in the art within the technical scope disclosed by the present invention shall fall within the protection scope of the present invention. Therefore, the protection scope of the present invention shall be subject to the appended claims.

What is claimed is:

1. A data transmission method, comprising:
    obtaining information about whether a service flow supports single Context ID, single Profile, or the single Context ID and the single Profile; and
    transmitting Robust Header Compression (ROHC) packets in the service flow, wherein the ROHC packets do not carry the Context ID, the Profile ID, or the Context ID and the Profile ID when determining a corresponding support in the service flow using the information obtained, and
    wherein the obtaining of the information comprises:
        receiving, by an Access Service Network Gateway (ASN-GW), an establishment request message from a Connection Service Network (CSN), the establishment request message carrying an ROHC parameter including an indication about whether the service flow supports the single Context ID, the single Profile, or the single Context ID and the single Profile;
        sending, by the ASN-GW, a message to a Base Station (BS), wherein the message carries the ROHC parameter;
        sending, by the BS, an air interface message to a Mobile Station (MS) to request for establishing an air interface connection corresponding to the service flow; wherein the air interface message carries the ROHC parameter;
        receiving, by the BS an air interface acknowledgement message from the MS,
        returning, by the BS, an acknowledgement message to the ASN-GW; and
        sending, by the ASN-GW, a response message to the BS.

2. The method according to claim 1, wherein a new ROHC_SUPPORT_ONE_PROFILE field is added to the ROHC parameter to indicate whether the service flow supports single Profile; and/or a new ROHC_SUPPORT_ONE_CONTEXT field is added to the ROHC parameter to indicate whether the service flow supports single Context ID.

3. The method according to claim 1, wherein a preset value of an ROHC_LARGE_CIDS field is set in the ROHC parameter to indicate whether the service flow supports single Context ID; and/or setting a preset value of an ROHC_PROFILES field is set to indicate whether the service flow supports single Profile.

4. The method according to claim 1, wherein at least one of the Context ID and the Profile ID is deleted from the ROHC packets to generate a format of the ROHC packets for the transmitting in accordance with the determining that indicates the corresponding support in the service flow.

5. A data transmission apparatus, wherein the apparatus comprises:

an obtaining module, configured to obtain information about whether a service flow supports single Context ID, single Profile, or the single Context ID and the single Profile; and a transmitting module, configured to transmit Robust Header Compression (ROHC) packets in the service flow, wherein the ROHC packets do not carry the Context ID, the Profile ID, or the Context ID and the Profile ID when determining a corresponding support in the service flow using the information obtained, and wherein obtaining of the information by the obtaining module comprises:

receiving, by an Access Service Network Gateway (ASN-GW), an establishment request message from a Connection Service Network (CSN), wherein: the establishment request message carries an ROHC parameter including the information about whether the service flow supports the single Context ID, the single Profile, or the single Context ID and the single Profile;

sending, by the ASN-GW, a message to a Base Station (BS), wherein the message carries the ROHC parameter;

sending, by the BS, an air interface message to a Mobile Station (MS) to request for establishing an air interface connection corresponding to the service flow; wherein the air interface message carries the ROHC parameter;

receiving, by the BS an air interface acknowledgement message from the MS, returning, by the BS, an acknowledgement message to the ASN-GW; and sending, by the ASN-GW, a response message to the BS.

\* \* \* \* \*